United States Patent [19]
Ramm et al.

[11] 3,880,930
[45] Apr. 29, 1975

[54] PROCESS FOR THE PRODUCTION OF 1-[CYCLOHEXENE-(1-YL])-CYCLOHEXANONE-(2) BY CONDENSATION OF CYCLOHEXANONE

[75] Inventors: Klaus Ramm, Waltrop; Wilfried Thielecke; Maximilian Zander, both of Castrop-Rauxel; Gerd Collin, Suisburg-Meiderich; Karl Ruhl, Castrop-Rauxel, all of Germany

[73] Assignee: Rutgerswerke Aktiengesellschaft, Frankfurt am Main, Germany

[22] Filed: May 24, 1973

[21] Appl. No.: 363,437

[30] Foreign Application Priority Data
May 29, 1972 Germany.......................... 22260168

[52] U.S. Cl............................................. 260/586 C
[51] Int. Cl.²......................................... C07C 45/00
[58] Field of Search..................... 260/586 R, 586 C

[56] References Cited
FOREIGN PATENTS OR APPLICATIONS
857,960   12/1952   Germany............................ 260/586

OTHER PUBLICATIONS

Astle et al., "J. Org. Chem.," Vol. 24, pp. 56–60 (1959).

Durr, "Comp. Rend." Vol. 236, pp. 1571–1573, (1953).

Lorette, "J. Org. Chem." Vol. 22, pp. 346–347 (1957) QD241.J6.

*Primary Examiner*—Bernard Helfin
*Assistant Examiner*—Norman Morgenstern

[57] ABSTRACT

In a process for the preparation of 1-[cyclohexene-(1-yl]-cyclohexanone-(2) by the condensation of cyclohexanone in the presence of a catalyst having high acidity and at an elevated temperature, the improvement wherein said process comprises heating cyclohexanone and at least one catalyst of the $HSO_3$-type at about 80°–110° C., at a pressure of about 60 – 200 torr and under reflux while removing by distillation water formed during said heating step. Typical catalysts are cation exchange resins of the $HSO_3$-type, benzenesulfonic acid and p-toluene sulfonic acid.

15 Claims, No Drawings

PROCESS FOR THE PRODUCTION OF 1-[CYCLOHEXENE-(1-YL)]-CYCLOHEXANONE-(2) BY CONDENSATION OF CYCLOHEXANONE

This invention relates to the preparation of 1-[cyclohexene-(1-yl)]-cyclohexanone-(2) by the condensation of cyclohexanone in the presence of a catalyst of the $HSO_3$- type.

It is known in the art that condensation products can be produced from cyclohexanone with the aid of acid or alkaline catalysts. These products result from two or more molecules of cyclohexanone with the formation of water. When 1-[cyclohexene-(1-yl)]-cyclohexanone-(2) is formed, the yield is frequently low, since higher molecular weight condensation products easily form.

Wallach (Ber. Dtsch. Chem. Ges. 40, 70, 1907) teaches the condensation of cyclohexanone in the presence of hydrochloric acid. Chlorocyclohexyl-cyclohexanone is first formed which is then converted in a second process step to cyclohexenyl-cyclohexanone. In this process, too, large quantities of higher molecular weight products are formed. Moreover, the technical execution is difficult because of the corrosive properties of the hydrochloric acid.

The use of sulfuric acid or of sulfonic acids (Gault, Daltroff, Ecktridon, Bl. (5) 12, 952, 1945; Plesek, Chem. Listy 50, 252, 1956; Jäger, Chem. Ber. 95, 242, 1962) results in a cyclohexenyl-cyclohexanone yield of about 75% with much higher molecular weight condensation products being formed, and likewise requires a corrosion resistant apparatus.

According to German Pat. No. 857,960, the condensation of the cyclohexanone can be catalyzed with acidic ion exchangers, but large quantities of catalyst are needed. Even when the conversion is 47%, the yield amounts to only about 80%.

Durr (Compt. Rend. 236, 1571, 1953) obtained only 20% yield with the acidic ion exchange resin Amberlite IR-120, and Lorette (J. Org. Chem. 22, 346, 1957) was able to achieve, in a very slow reaction (51.5 hours), a yield of only 73.5% at 74% conversion.

In Japanese patent application 70 41377, again the condensation of cyclohexanone by catalysis with acid ion exchangers is described. However, the reaction temperature (130° to 135° C.) lies above the maximum temperature of most cation exchangers (K. Dorfner "Ion Exchangers, Characteristics and Applications," 2nd Edition, Walter DeGruyter & Co., Berlin, 1964), so that a rapid deactivation and destruction of the valuable catalyst occurs.

Therefore, there exists a need in the art for a process which will result in higher yields of the desired condensation product with comparatively low catalyst losses and short reaction times.

Surprisingly, it has now been found that cyclohexenyl-cyclohexanone can be produced by the condensation of cyclohexanone in the presence of acidic ion exchangers or sulfonic acids in a simple manner with very good yields, if one operates at a reduced pressure.

Accordingly, this invention provides an improved process for the preparation of 1-[cyclohexene-(1-yl)]-cyclohexanone-(2) by the condensation of cyclohexanone in the presence of a catalyst having high acidity and at an elevated temperature. The improvement comprises heating the cyclohexanone and at least one catalyst of the $HSO_3$-type at about 80° – 110° C., at a pressure of about 60 – 200 torr and under reflux. Water formed during the reaction is removed from the reaction mass by distillation. Preferred catalysts for use in this invention are cation exchange substances of the $HSO_3$-type and sulfonic acids. Preferred sulfonic acids are benzene sulfonic acid and toluene sulfonic acid.

According to a preferred embodiment of this invention, cyclohexanone is heated at boiling with about 4% by weight of the catalyst at a decreased pressure (between 60 and 200 torr). Water forming in the azeotropic mixture is distilled off with cyclohexanone. After separating the water, the cyclohexanone is returned to the reaction vessel. The degree of conversion of the cyclohexanone can be controlled by the volume of the water separated.

After completion of the reaction and in the case of use of ion exchangers, the reaction mixture is in an acid-free form, and the product can be separated by filtration. In the case of use of sulfonic acids, the product must be washed with water. By subsequent distillation in a vacuum, one will obtain cyclohexenyl-cyclohexanone in a yield of about 90% at a cyclohexanone conversion of about 50 – 60%.

The reaction times depend on the type and quantity of catalyst, and typically they lie between about 45 minutes (p-toluene sulfonic acid) and about 5 hours (Amberlite IR-200).

Since the process of this invention is operated below about 120° (maximum permissible operating temperature for most cation exchange substances) the catalyst is only under little load and can be used again many times over.

The cyclohexenyl-cyclohexanone obtained in accordance with the process of this invention can be dehydrated to o-phenylphenol, which is useful as a preservative and as a carrier for dyeing synthetic fibers.

This invention can be more clearly understood by reference to the following Examples. All parts, proportions, percentages and ratios are by weight unless otherwise indicated.

EXAMPLE 1

25 parts of cyclohexanone are heated with 1 part Amberlite IR-200 while stirring at pressure of 60 torr with reflux in a water separator (inside temperature 80° C.). Water formed during the reaction is removed continuously by azeotropic distillation with cyclohexanone, and is separated in the water separator. The distilled cyclohexanone is conducted back to the reaction vessel. After 5 hours, 1.6 parts of water have been separated. Then the catalyst is filtered off, and the reaction mixture is distilled in a vacuum. 10.1 parts cyclohexanone (conversion 59.9%), 12.1 parts cyclohexenyl-cyclohexanone, corresponding to a yield of 90% of theoretical, and 0.7 parts of a higher molecular weight residue is obtained.

EXAMPLE 2

25 parts of cyclohexanone are heated with 1 part Amberlite IR-200 while stirring at a pressure of 200 torr with reflux in a water separator (inside temperature 110° C.). After 90 minutes, 1.5 parts of water have been separated, and the reaction mixture is analyzed by gas chromatography. The cyclohexanone conversion is 56%, and 93% cyclohexenyl-cyclohexanone yield (related to converted cyclohexanone) is obtained.

EXAMPLE 3

25 parts cyclohexanone are heated with 1 part Amberlyst 15 while stirring at a pressure of 60 torr with reflux in a water separator (inside temperature 80° C.) equipped with an agitator. After 80 minutes, 1.37 parts of water have been separated. The agitator is stopped, and the remaining reaction solution is (21.2 parts) sucked off.

After that, 25 parts of cyclohexanone are again put into the reaction vessel with the catalyst and the remaining reaction solution, and the experiment is repeated. After 95 minutes, 1.45 parts of water have been separated, and 23.2 parts of reaction solution are sucked off.

After a second repetition of the experiment, again 1.45 parts of water have been separated within 95 minutes. After filtering off the catalyst, 24.9 parts of reaction mixture are obtained. The reaction mixtures are distilled in a vacuum. 32 parts of cyclohexanone (conversion 57.4%), 35 parts of cyclohexenyl-cyclohexanone, corresponding to a yield of 89.9% of theoretical, and 2.3 parts of a higher molecular weight residue are obtained.

EXAMPLE 4

25 parts of cyclohexanone are heated with 1 part of p-toluene sulfonic acid at a pressure of 60 torr with reflux in a water separator (inside temperature 80° C.). After 45 minutes, 1.15 parts of water have been separated, and the reaction mixture is analyzed by gas chromatography. A cyclohexanone conversion of 53% and a 91% cyclohexenyl-cyclohexanone yield (related to converted cyclohexanone) are obtained.

EXAMPLE 5

25 parts of cyclohexanone are heated with 1 part Amberlite XE-307 while stirring at a pressure of 60 torr with reflux in a water separator (inside temperature 80° C.). After 2.5 hours, 1.4 parts of water have been separated, and the reaction mixture is analyzed by gas chromatography. A cyclohexanone conversion of 57% and a 93% cyclohexenyl-cyclohexanone yield (related to converted cyclohexanone) are obtained.

What is claimed is:

1. In a process for the preparation of 1-[cyclohexene-(1-yl)]-cyclohexanone-(2) by the condensation of cyclohexanone in the presence of a catalyst having high acidity and at an elevated temperature under reflux while removing by distillation water formed during said heating step, the improvement wherein said process comprises heating to boiling at a pressure of about 60 – 200 torr cyclohexanone and at least one catalyst selected from the group consisting of sulfonic acid cation exchange resins, benzene sulfonic acid and toluene sulfonic acid.

2. Process according to claim 1 in which said catalyst having high acidity is a sulfonic acid cation exchange resin.

3. Process according to claim 1 in which the catalyst is p-toluene sulfonic acid.

4. Process according to claim 1 in which the catalyst is benzene sulfonic acid.

5. Process according to claim 1 in which said cyclohexanone is heated with about 4% by weight of said catalyst.

6. Process according to claim 1 in which water formed is distilled off with cyclohexanone, the water and cyclohexanone in the distillate are at least partially separated, and cyclohexanone is returned to the reaction.

7. Process according to claim 5 in which water formed is distilled off with cyclohexanone, the water and cyclohexanone in the distillate are at least partially separated, and cyclohexanone is returned to the reaction.

8. Process according to claim 1 in which the cyclohexanone and catalyst are heated for about 45 minutes to about 5 hours.

9. Process according to claim 5 in which the cyclohexanone and catalyst are heated for about 45 minutes to about 5 hours.

10. Process according to claim 6 in which the cyclohexanone and catalyst are heated for about 45 minutes to about 5 hours.

11. Process according to claim 7 in which the cyclohexanone and catalyst are heated for about 45 minutes to about 5 hours.

12. Process according to claim 6 in which the resulting product is separated by filtration.

13. Process according to claim 10 in which the resulting product is separated by filtration.

14. Process according to claim 12 in which the product is washed with water after the filtration.

15. Process according to claim 13 in which the product is washed with water after the filtration.

* * * * *